Oct. 13, 1925.
E. B. TILDEN
ANTIGLARE DEVICE
Filed Aug. 1, 1923
1,557,388
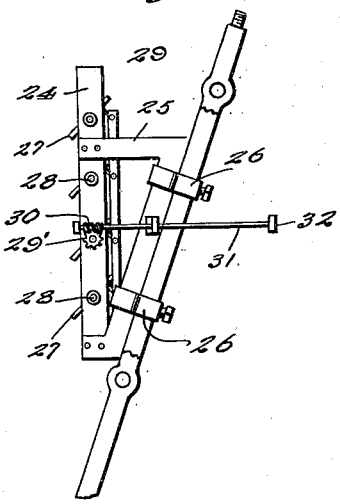
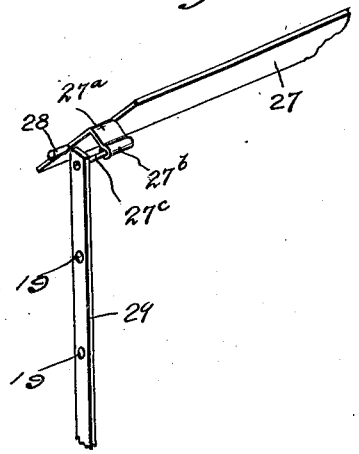
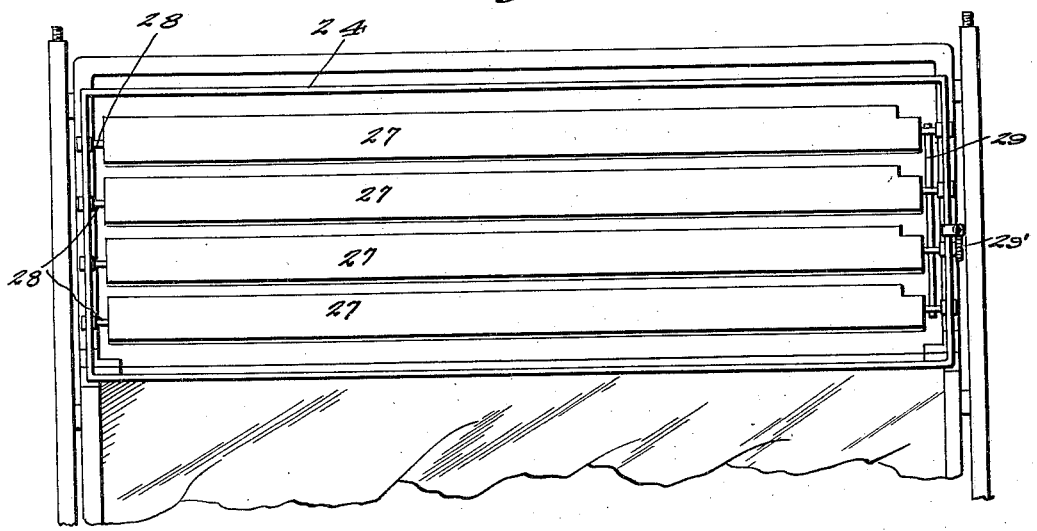
E. B. Tilden INVENTOR
BY Victor J. Evans ATTORNEY Patented Oct. 13, 1925.

1,557,388

UNITED STATES PATENT OFFICE.

EDWARD B. TILDEN, OF NEW ORLEANS, LOUISIANA.

ANTIGLARE DEVICE.

Application filed August 1, 1923. Serial No. 655,123.

*To all whom it may concern:*

Be it known that I, EDWARD B. TILDEN, a citizen of the United States, residing at New Orleans, in the parish of Orleans and State of Louisiana, have invented new and useful Improvements in Antiglare Devices, of which the following is a specification.

This invention relates to attachments for windshields of automobiles and has for its object the provision of a novel device designed to be mounted upon the windshield and to remain permanently thereon for the purpose of shielding the driver's eyes from blinding or glaring headlights on approaching cars.

An important and more specific object is the provision of a device of this character including a frame having pivoted therein a plurality of shutters which are equipped with means for adjusting the position thereof to suit the requirements or notions of the individual driver so as to shield his eyes from glare.

Another object is the provision of a device of this character which may be manufactured and sold as a complete and separate entity, adapted to be detachably mounted upon the windshield of an automobile at either the outside or the inside thereof depending upon the modification of the device.

An additional object is the provision of a glare shield of this type which may be simple and inexpensive in manufacture, easy to install and use, positive in action, efficient and durable in service and a general improvement in the art.

With the above and other objects and advantages in view the invention consists in the details of construction to be hereinafter more fully described and claimed and illustrated in the accompanying drawings in which:

Figure 1 is a side elevation of the device showing it mounted upon a portion of a windshield, Figure 2 is a front elevation, Figure 3 is a detail perspective view showing one of the shutters and elements associated or connected therewith.

Referring more particularly to the drawings, I have shown the device as designed to be mounted in advance of the windshield, that is, at the side of the windshield away from the driver. In carrying the invention, I provide a frame 24 preferably of such width as to extend entirely across the windshield. The frame is equipped with brackets 25 carrying clamps 26 of any suitable kind adapted to be engaged about the windshield frame bars. Extending across the frame are shutters 27 carrying trunnions 28 journaled in the opposite sides of the frame. The shutters are each formed at one end with an outstruck laterally extending lug $27^a$ terminating in a bead $27^b$ within which is engaged a pin $27^c$, and all of these pins are connected by a link 29 for effecting simultaneous movement of all the shutters.

For effecting operation of the shutters, I equip one of the trunnions with a worm wheel 29 with which meshes a worm 30 on one end of a shaft 31 which extends along side of the windshield frame and which terminates in a head 32 which may be turned by the operator for adjusting the shutters.

From the foregoing description and a study of the drawings it will be apparent that I have thus provided a simply constructed, inexpensive and easily installed protector which will efficiently operate to prevent a driver from being blinded by the glare of approaching headlights. The use of this device makes it unnecessary for cars to be equipped with a headlight dimming device as the driver will be protected regardless of the glare.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. An anti-glare attachment for windshields comprising a frame adapted to be disposed in advance of a windshield and having means for attachment to the frame thereof, a plurality of shutters having trunnions journaled in the frame, a rod connecting all the shutters for simultaneous movement, a toothed disk on a trunnion of one shutter, bearings on the first named frame, a control shaft journaled through said bearings and extending rearwardly beyond the side of the windshield with one end projecting into the vehicle and equipped with an operating head, and a worm on said shaft meshing with said toothed disk 2. In a device of the character described, a frame provided with means for attachment to a windshield, a plurality of shutters journaled within the frame, each shutter having one corner formed with a struck out lug extended at right angles and terminating in a bead, a rod, and pins carried by the rod and engaging within said beads for effecting simultaneous movement of all the shutters.

In testimony whereof I affix my signature.

EDWARD B. TILDEN.